Nov. 3, 1925.                                                                  1,560,463
R. S. BURDETTE
AIR BAG
Filed Jan. 26, 1923          2 Sheets-Sheet 1

INVENTOR
RICHARD S. BURDETTE
BY
ATTORNEY

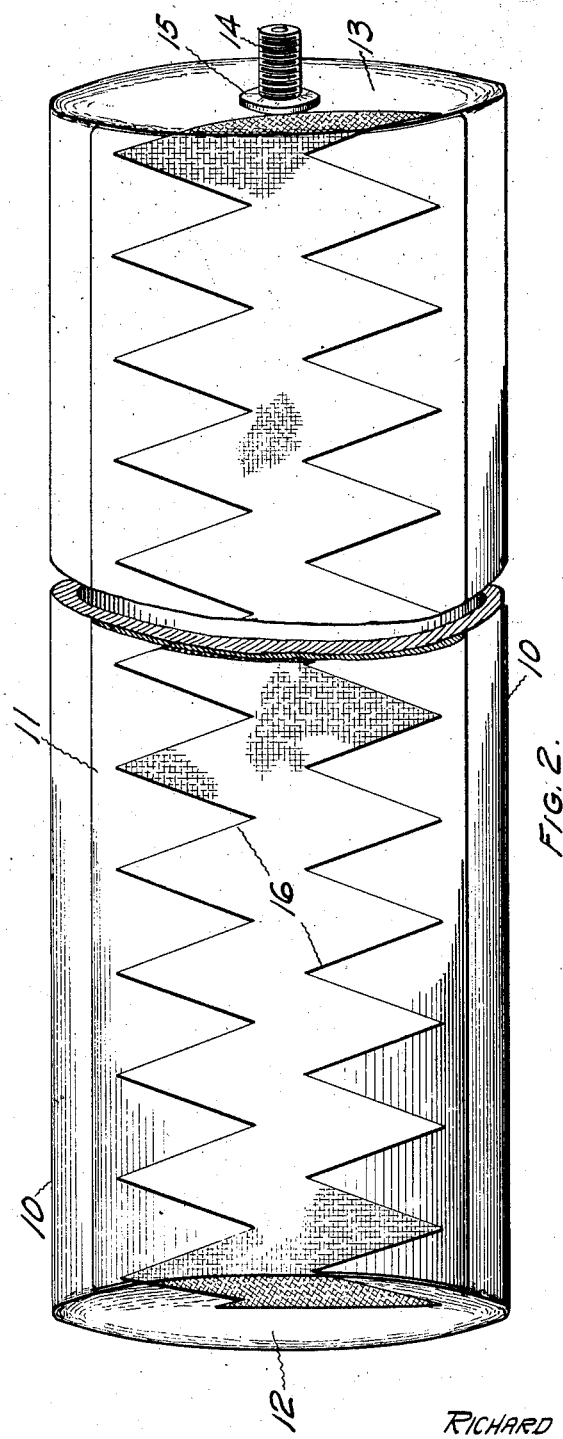

Patented Nov. 3, 1925.

1,560,463

UNITED STATES PATENT OFFICE.

RICHARD S. BURDETTE, OF AKRON, OHIO, ASSIGNOR TO THE GOODYEAR TIRE AND RUBBER COMPANY, OF AKRON, OHIO, A CORPORATION OF OHIO.

AIR BAG.

Application filed January 26, 1923. Serial No. 615,107.

*To all whom it may concern:*

Be it known that I, RICHARD S. BURDETTE, a citizen of the United States, and resident of Akron, Ohio, have invented new and useful Improvements in Air Bags, of which the following is a specification.

My invention relates to air bags of the type designed for use in the manufacture and repair of casings for pneumatic tires, and to a method of constructing such bags.

Air bags of the above designated character are extensively used as expansible core elements for forcing the walls of a tire casing outwardly against a confining mold, or against a wrapping, or for other purposes in conjunction with the vulcanization and repair of tire casings, all of which will be apparent to those skilled in the art.

Tire casings vary considerably as to the width of bead and dimensions of casings and therefore it is desirable to so reinforce a bag that it may be advantageously used with a great variety of tire casings and that it will readily adapt itself to the various widths of beads that are found on tire casings of various manufactures. It is of major importance that an air bag be capable of radial expansion rather than longitudinal extension and that the bag be reinforced against abnormal localized expansion.

In accordance with my invention I provide an air bag that is reinforced along one side with a strip of fabric that limits the radial expansibility of the bag in that zone from a minimum at the center of the strip to its normal expansibility at the serrated edge of the strip. By providing this varying degree of radial expansibility, an air bag is produced that readily adapts itself to the narrower types of beads by flattening against the base of the mold. The expansibility of the bag over the region where repairs are to be made is not impaired in any way and the use of the reinforcement that I propose greatly prolongs the life of the bag.

My invention also contemplates an improved method of manufacturing such a bag, and particularly of placing end pieces in the bag and of mounting the valve stem in the end pieces.

Further objects and advantages will be apparent from a perusal of the accompanying drawings, in which:

Fig. 2 is a side elevational view taken at right angles to the view shown in Fig. 1;

Figure 1:
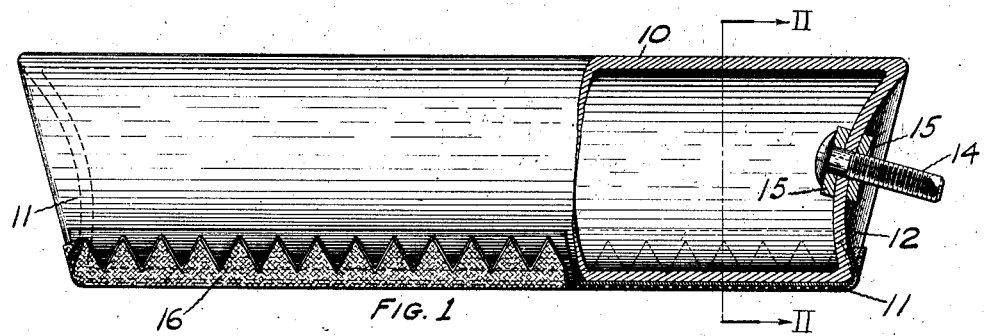
Fig. 1 is a side elevational view of an air bag, with parts broken away, shown in the process of construction.
Figure 3:
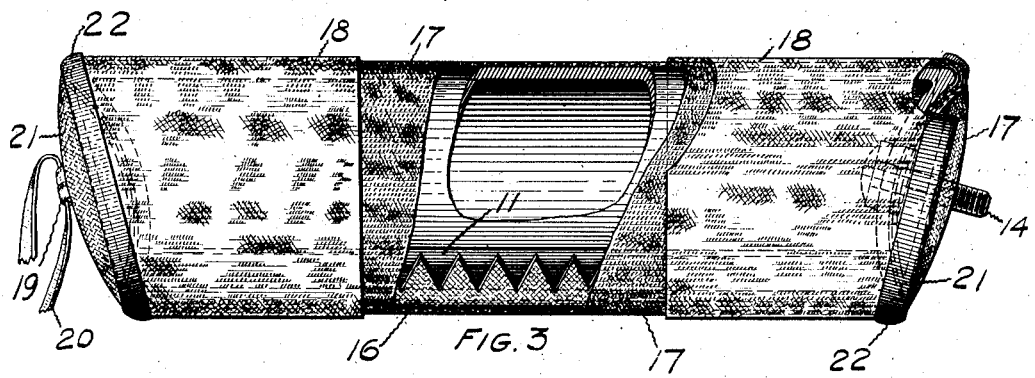
Fig. 3 is a side elevational view, with parts broken away, of the air bag in a later stage of manufacture.

My improved air bag can best be described by following the various steps in its manufacture. A tube 10 of uncured rubber gum is first formed, either from sheet material or by the use of an extruding machine. The opposite ends of the tube are then cut so that they lie in divergent planes, thus making the elements of the tube shorter on one side than on the other.

By cutting the tube ends at an angle to the normal section of the bag, the fabric elements of the reinforcements for the bag are maintained under uniform tension during the cure of the bag in its arcuate shape. It is very important in bags of this nature to maintain uniform tension in the reinforcing cord elements.

One wall of the tube is then thickened by adding a strip 11 of gum to the tube or, if the tube is formed in an extruding machine, one side is formed thicker than the remainder of the tube.

End pieces 12 and 13 of uncured gum are positioned as shown in the drawings and stitched in place from the outside of the bag by compressing the edges of the seam to form a butt joint. This is a novel method of securing the ends in bags of this type that has, to my knowledge, never before been practiced. One of the members 13 is fitted with a valve stem 14 by means of which the bag may be inflated. A pair of semi-cured washers 15, one of which is placed on each side of the end member, serve to hold the valve in place. By using semi-cured washers, it is practicable to tighten the valve nut a sufficient degree to permit of the curing of the bag on its own air pressure without materially distorting the rubber of the end member and the accompanying washers during vulcanization.

After the end members 12 and 13 are stitched in place, a strip of reinforcing fabric 16, that is cut in zig-zag form, is mounted on the gum strip or the thickened portion 11 of the bag. The fabric strip 16 is preferably formed of bias cut frictioned fabric. The ends of the strip preferably extend slightly beyond each end of the bag to insure more uniform distribution of longitudinal stresses in the fabric strip. Fig. 2 illustrates a desirable proportion of the width of the reinforcing strip to the tongues formed thereon and the method of mounting the strip on the side of the bag. Although I have described this strip 16 as formed of bias cut fabric, it can satisfactorily be made of any material that will protect the air bag over this area from pinching during the use of the bag and that will restrict the expansibility of the bag over the area to which it is applied. The reinforcing strip also protects the bag against excessive localized stretch along the base of the bag or where the bag engages the tire beads. This is a common cause of failure in the previously suggested types of air bags.

After the reinforcing member 16 is applied, the tube is covered with a layer 17 of cord fabric, the elements of which extend parallel to the axis of the tube and the end portions of which are slit and lapped over the respective ends of the bag. A fabric cap 18 is then placed on each end of the bag and portions of the respective caps 18 are slit and folded over the ends of the bag as previously set forth. These end caps not only constitute additional reinforcing means for the ends of the bag, but they also permit, during final vulcanization, the escape of any air entrapped in the ply up of the bag.

At one end of the bag, preferably the end that is not provided with the valve stem, the ends of diametrically opposite strips of cord fabric are overlapped and folded to provide a loop 19 that is adapted to receive a handling cord 20 for use in removing the bag from a tire casing.

A piece of woven fabric 21, that has an opening of just sufficient size to receive the loop 19 on one end and the valve stem 14 on the other end, is applied to each end of the bag and a strip of rubber gum 22 is placed over the juncture of the end pieces 21 with the sides of the bag.

Figure 4:
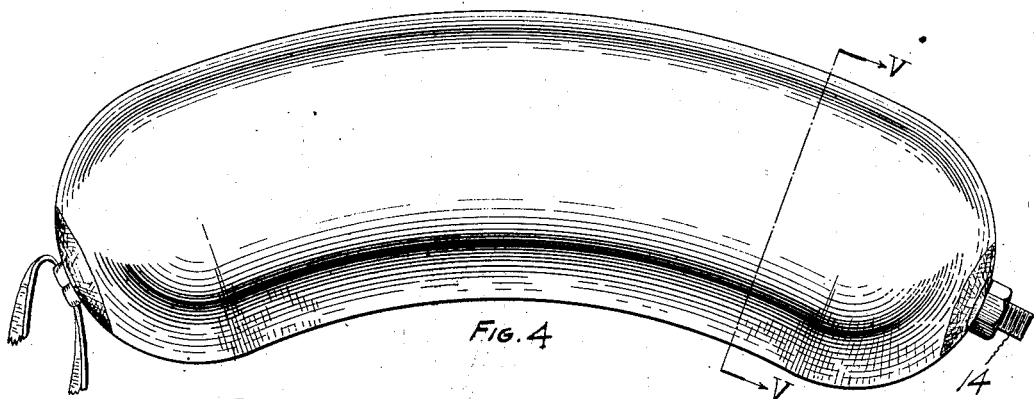
Fig. 4 is a side elevational view of the completed air bag.
Figures 5, 6:
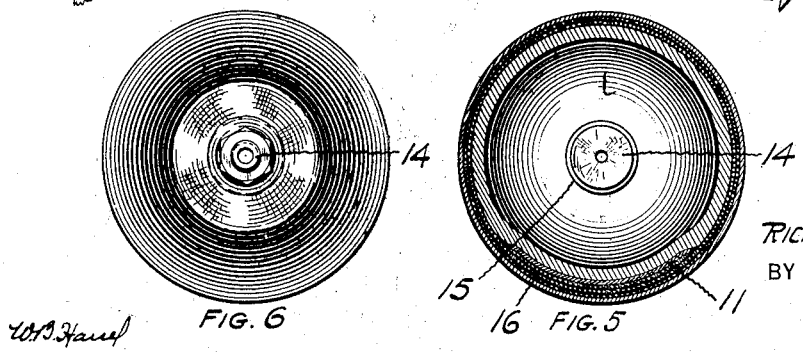
Fig. 5 is a sectional view taken substantially on line V—V of Fig. 4.
Fig. 6 is an end elevational view of the bag shown in Fig. 2.

A thin sheet of rubber gum is then placed over the entire bag, with the exception of the ends, and the bag is vulcanized in a mold to form the completed product shown in Fig. 4.

Although I have illustrated and described a single device incorporating my invention, it is evident that the benefits of my invention may be secured by employing structures differing to a greater or less degree from those herein shown. I desire, therefore that only such limitation shall be imposed as are indicated in the appended claims.

What I claim is:

1. An air bag embodying resilient walls reinforced on one side only with a single strip of substantially non-stretchable cross woven fabric.

2. An air bag embodying resilient walls reinforced with a cross woven strip of fabric having serrated edges.

3. An air bag embodying resilient walls reinforced with a cross woven strip of fabric having a series of fingers extending laterally therefrom.

4. An expansible air bag embodying walls reinforced with a strip of material having a series of fingers extending laterally therefrom, said strip of material extending longitudinally of said bag to locally restrict the expansion thereof.

5. A tubular inflatable container comprising reinforced tubular walls adapted to be expanded only in a lateral direction with respect to the major axis of the container, and a single reinforcing strip extending longitudinally of the container over only a small portion of its area, and restricting lateral expansion over that area.

6. An air bag embodying walls reinforced with unwoven cord elements, and a cross woven fabric reinforcement extending longitudinally of said cord elements.

7. A unitary expansible air bag for receiving fluid under pressure embodying walls reinforced with cord elements, all of which extend in the same direction, and a reinforcing fabric strip extending longitudinally of the bag.

8. A tubular inflatable container comprising walls reinforced with cord elements extending longitudinally of the container and a strip of cross woven fabric of varying width adapted to reinforce one side of said container.

9. An expansible air bag embodying walls reinforced with cord elements all of which extend in substantially the same direction and a cross woven fabric reinforcement extending in the direction of said cord elements and adapted to prevent expansion of the bag over a predetermined area.

10. A tubular inflatable container comprising walls reinforced with cord elements extending longitudinally of the container, a strip of fabric having serrated edges applied longitudinally to one side of the container and extending the entire length thereof, the serrated edges of said strip extending laterally therefrom and adapted to confer varying degrees of extensibility to the bag in accordance with the distance from the median line of said strip.

11. A tubular inflatable container comprising walls reinforced with cord elements extending longitudinally thereof and adapted to substantially prevent elongation of said container, said walls being freely expansible in a lateral direction, and a strip of fabric applied longitudinally of said container adapted to limit the lateral expansion thereof over a predetermined small zone.

12. The method of building an inflatable rubber container which consists in mounting a semi-cured rubber washer on a valve stem on each side of a wall of unvulcanized rubber, and vulcanizing said assembly.

In witness whereof, I have hereunto signed my name.

RICHARD S. BURDETTE.